United States Patent [19]

Simpson

[11] 3,929,884
[45] Dec. 30, 1975

[54] INTERMEDIATES IN THE SYNTHESIS OF 5-ALKYLAMINO-7-PHENYL OR SUBSTITUTED PHENYL-2,3-DIHYDRO-1H-1,4-DIAZEPINES

[75] Inventor: William R. J. Simpson, Mendham, N.J.

[73] Assignee: Sandoz, Inc., E. Hanover, N.J.

[22] Filed: Mar. 29, 1974

[21] Appl. No.: 456,017

[52] U.S. Cl.. 260/564 R; 260/239 BC; 260/501.14; 424/244
[51] Int. Cl.[2] .................................... C07C 123/00
[58] Field of Search ............... 260/564 R, 501.14

[56] References Cited
UNITED STATES PATENTS

| | | | |
|---|---|---|---|
| 3,562,244 | 2/1971 | Bodanszky et al. | 260/564 R |
| 3,819,703 | 6/1974 | Draber et al. | 260/564 R |

*Primary Examiner*—Gerald A. Schwartz
*Attorney, Agent, or Firm*—Gerald D. Sharkin; Richard E. Vila; Melvyn M. Kassenoff

[57] ABSTRACT

Compounds of the formula

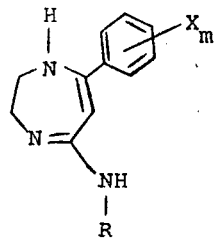

wherein
R is alkyl of 1 to 6 carbon atoms,
each X is independently alkyl of 1 to 4 carbon atoms, alkoxy of 1 to 4 carbon atoms or halo, and
$m$ is 0, 1 or 2, and pharmaceutically acceptable acid addition salts thereof, are useful as anti-obesity and anti-diabetic agents. They are synthesized by reacting a 2-alkyl-5-arylisoxazolium salt with ethylene diamine to obtain a compound of the formula

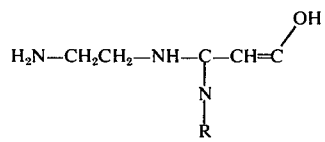

or a tautomer thereof, wherein R, X and $m$ are as defined above, which is then cyclized with a strong acid.

7 Claims, No Drawings

INTERMEDIATES IN THE SYNTHESIS OF 5-ALKYLAMINO-7-PHENYL OR SUBSTITUTED PHENYL-2,3-DIHYDRO-1H-1,4-DIAZEPINES

This invention relates to compounds of the formula

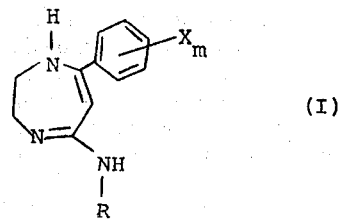

wherein R is alkyl of 1 to 6 carbon atoms,
X is alkyl of 1 to 4 carbon atoms, alkoxy of 1 to 4 carbon atoms or halo, and
m is 0, 1 or 2,
and the pharmaceutically acceptable acid addition salts thereof, to the synthesis of these compounds and to their use as anti-obesity and anti-diabetic agents.

The preferred compounds of this application are those of Formula I wherein m is 0 or 1, and the pharmaceutically acceptable acid addition salts thereof, as well as the compounds of this group
wherein X is alkyl of 1 to 3 carbon atoms, methoxy, ethoxy,
chloro or bromo and is meta or para to the diazepine ring (when m is 1), and
m is 0 or 1,
and the pharmaceutically acceptable acid addition salts thereof.

Particularly preferred compounds are those of Formula I
wherein m is 0, and the pharmaceutically acceptable acid addition salts thereof.

The most preferred compounds are the compound of Formula I
wherein
R is t-butyl, and
m is 0,
and its pharmaceutically acceptable acid addition salts.

The term "halo" means chloro, bromo or fluoro.

All pharmaceutically acceptable acid addition salts of the compounds of Formula I (i.e., those salts which do not significantly increase the toxicity of the basic compound) are included within the scope of this invention. Included are salts with inorganic acids, e.g., the hydrochloride, hydrobromide, hydroiodide, phosphate (including hydrogen phosphates), metaphosphate, sulfate (including hydrogen sulfate) and perchlorate salts and salts with organic acids, e.g., the acetate, propionate, tartarate, citrate, gluconate, fumarate, malate, maleate, methanesulfonate, ethanesulfonate, benzenesulfonate and p-toluenesulfonate salts.

The compounds of Formula I can be synthesized from isoxazolium salts and ethylene diamine by a two-step synthesis.

In Step A of the synthesis, an isoxazolium salt of the formula

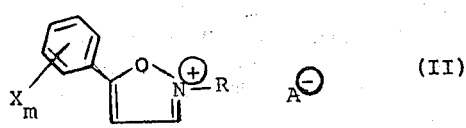

wherein
R, X and m are as defined above in connection with Formula I, and
$A^-$ is a non-interfering anion, e.g., perchlorate, fluoroborate, methylsulfate, ethylsulfate, bisulfate, chloride, bromide or iodide,
is reacted with ethylene diamine ($NH_2$-$CH_2CH_2$-$NH_2$) in an inert organic solvent at a temperature of $-10°$–$40°C.$, preferably $10°$–$35°C.$, to obtain a compound of the formula

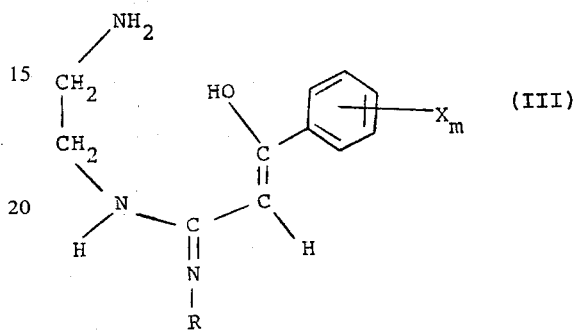

As is well-known to those in the art, the reaction time necessary is inversely related to the reaction temperature, i.e., the higher the reaction temperature, the shorter the reaction time. It is, therefore, impossible to give a precise reaction time. However, a reaction time of 20–120 minutes is generally acceptable with a reaction time of 30–90 minutes being preferred.

The reaction solvent is not critical. Any non-nucleophilic organic solvent in which the reactants are soluble and having a boiling point at or above the desired reaction temperature may be used. An inert solvent is one that does not react with either of the starting materials under the reaction conditions employed. Among the inert solvents that are suitable are liquid halogenated lower alkanes (e.g., methylene chloride, chloroform, 1,2-dichloroethane, 1,2-dibromoethane, 1,1,1-trichloroethane and 1-bromo-2-chloroethane), symmetrical and unsymmetrical dialkyl ethers having a total of at least 5 carbon atoms and preferably no more than 10 carbon atoms, cyclic ethers (e.g., p-dioxane and tetrahydrofuran), lower alkyl nitriles (e.g., acetonitrile), lower alkyl esters of lower alkanoic acids, N,N-dimethylacetamide and formic acid amides (e.g., formamide and its N-monolower alkyl and N,N-dilower alkyl derivatives such as N-ethylformamide, N,N-dimethylformamide, N,N-diethylformamide and N-methyl-N-ethylformamide) and mixtures of these solvents. The halogenated lower alkanes are preferred with methylene chloride being particularly preferred.

While the molar ratio of ethylene diamine to isoxazolium salt can be as low as 1:1, it is preferably at least 1.5:1 in order to minimize reaction of the compound of Formula III with another isoxazolium cation. However, a large molar excess of ethylene diamine is generally employed, e.g., 2 to 10 mols of ethylene diamine per mol of isoxazolium salt.

Since the reaction is exothermic, the isoxazolium salt is generally added to a solution of ethylene diamine in small portions at a rate such that the temperature of the reaction mixture does not exceed the maximum desired temperature. If necessary, the reaction mixture is cooled during addition of the isoxazolium salt to prevent the temperature from rising precipitously.

In Step B, a compound of Formula III is treated with a strong acid to effect cyclization to an acid addition salt of a compound of Formula I. The cyclization is carried out in an inert organic solvent at a temperature of 45°–120°C., preferably 55°–100°C., under an inert atmosphere (nitrogen, helium, neon, argon, krypton or xenon, or a mixture thereof).

As in the case of Step A, a precise reaction time cannot be given because the higher the reaction temperature, the shorter the reaction time. However, a reaction time of 30–180 minutes, preferably 60–120 minutes, is generally employed.

Any inert organic solvent in which the reactant is soluble and which has a boiling point at or above the desired reaction temperature may be employed. As indicated above, an inert solvent is one that does not react with the reactant, i.e., one that does not interfere with the desired intramolecular cyclization. Among the inert solvents that are suitable are lower alkanols (e.g., ethanol, n-propanol, iso-propanol, n-butanol, sec.-butanol and iso-butanol), halogenated lower alkanes (e.g., 1,1,2-trichloroethane and 1,2-dichloroethane), cyclic ethers such as p-dioxane, symmetrical and unsymmetrical dialkyl ethers having a total of at least 5 carbon atoms and preferably no more than 10 carbon atoms, lower alkyl nitriles (e.g., acetonitrile), lower alkyl esters of lower alkanoic acids and formic acid amides (e.g., formamide and its N-monolower alkyl and N,N-dilower alkyl derivatives such as N-ethylformamide, N,N-dimethylformamide, N,N-diethylformamide and N-ethyl-N-methylformamide) and mixtures of these solvents. The preferred solvents are the lower alkanols. The most preferred solvents are ethanol, propanol and iso-propanol.

Any strong acid can be used to effect cyclization, e.g., perchloric acid, hydrochloric acid, hydrobromic acid, sulfuric acid, methanesulfonic acid, ethanesulfonic acid, benzenesulfonic acid and p-toluenesulfonic acid. The acid may be employed in any form, e.g., as a concentrated aqueous acid, as a solution in an organic solvent, e.g., a lower alkanol such as ethanol, propanol or iso-propanol, or in undiluted form. For example, perchloric acid is usually used as a 70% aqueous solution, hydrochloric and hydrobromic acids are generally employed as saturated solutions of gaseous hydrogen chloride and hydrogen bromide, respectively, in one of the aforementioned lower alkanols, sulfuric acid is employed as a concentrated liquid, and the aforementioned sulfonic acids are usually used as solids. While as little as one equivalent of the acid can be employed, an excess is generally used. Standard operating procedure is to add sufficient acid to bring the pH to about 1 to 4, preferably 2 to 3, as indicated by moist pH paper.

The two steps of the synthesis can be carried out successively without isolating the intermediate of Formula III or even combined into a single step. A reaction temperature of 45°–120°C., preferably 55°–80°C., a reaction time of 30–180 minutes, preferably 60–120 minutes, after addition of the isoxazolium salt has been completed, and an inert atomosphere are generally employed for the one-step reaction. The solvents indicated to be useful for Step A of the two-step synthesis are useful for the one-step reaction. However, the two-step synthesis described above is preferred since it gives a cleaner product, i.e., a product that requires less purification.

The obtained acid addition salts of the compounds of Formula I can be converted to other acid addition salts and to the free base (amine) by conventional means. For example, the methanesulfonate salt of Example 3 can be converted into the free base by partition between aqueous sodium hydroxide and chloroform.

The isoxazolium salts of Formula II are known or can be produced by a conventional quaternization of the corresponding isoxazole with a strong alkylating agent such as triethyloxonium fluoroborate or a mixture of t-butanol and perchloric acid. See, for example, Woodward et al., J. Amer. Chem. Soc. 83, 1007–1009 (1961), Woodward et al., J. Amer. Chem. Soc. 83, 1010–1012 (1961), and Woodward et al., J. Org. Chem. 31, 2039–2040 (1966). The isoxazoles are either known or can be prepared by conventional processes from known precursors.

The compounds of Formula I and their pharmaceutically acceptable acid addition salts are useful as anti-obesity and anti-diabetic agents as indicated by (a) glucose transport tests carried out in male Wistar rats, (b) hypoglycemic tests carried out in male ICR mice, and (c) anti-hyperglycemic tests carried out in male ICR mice.

a. Glucose transport test: Male Wistar rats are dosed orally with 10–80 mg./kg. body weight of the test compound after at least 20 hours of fasting. One hour after receiving the drug each animal is sacrificed and the upper small intestine is removed and washed with glucose-saline. A 5 cm. section of the intestine is everted so that the mucosal surface is on the outside. One end of the segment is tied and the center of the sac so formed is filled with oxygen saturated Kreb's bicarbonate buffer. The other end is then closed and the sac is incubated in 10 ml. of oxygen saturated bicarbonate buffer for 60 minutes at 37°C. Both the outside and inside solutions contain initially 0.3% of glucose. At the end of the incubation time, the glucose content of the outer (mucosal) and the inner (serosal) solution is determined using the standard Auto Analyzer procedure. Similar tests are run simultaneously with control animals. The percent inhibition of glucose transport caused by the drug is calculated from the formula $$I = \frac{S_t - M_t}{S_c - M_c} \times 100,$$

wherein $I$ = percent inhibition, $S_t$ = glucose concentration (mg.%) of serosal fluid at the end of an experiment in the drug-treated animal, $S_c$ = glucose concentration (mg.%) of serosal fluid at the end of an experiment in the control animal, $M_t$ = glucose concentration (mg.%) of mucosal fluid at the end of an experiment in the drug-treated animal, and $M_c$ = glucose concentration (mg.%) of mucosal fluid at the end of an experiment in the control animal.

b. Hypoglycemic test: 6–8 week old adult male ICR mice having a body weight of 30–35 g. are dosed orally with 75–200 mg./kg. body weight after 16 hours of fasting. A control group receiving 0.5% carboxymethyl cellulose vehicle is run concurrently. Two hours later the mice are anesthetized with sodium hexobarbital (85 mg./kg. i.p.) and blood is collected via cardiac puncture. The blood is placed in an Auto Analyzer cup containing 0.025 cc of a heparin preparation containing 1,000 units/ml. and the samples are capped, shaken and kept in an ice bucket. The glucose content of each sample is measured by the standard Auto Analyzer potassium ferric cyanide method (No. N-2b). To validate the test a known hypoglycemic standard is included each time the test is run. The activity of the compound is calculated from the formula $$A = \frac{G_c - G_t}{G_c} \times 100$$

wherein $A$ = % reduction of the glucose concentration of the blood achieved by the test compound, $G_c$ = glucose concentration (mg.%) of the blood of the control animals, and $G_t$ = glucose concentration (mg.%) of the blood of the animals receiving the test compound.

c. Anti-hyperglycemic test: Procedure (b) is followed with the following modification: 1½ hours after the mice are dosed with the test compound or the carboxymethyl cellulose vehicle, the mice receive a glucose challenge of 2 g./kg. body weight p.o. (See Laboratory Animal Digest 7 (4), 76 (1972).) with the sodium hexobarbital anesthetization (85 mg./kg. i.p.) occuring 25 minutes later. The blood is collected exactly 30 minutes following administration of the glucose challenge. A known anti-hyperglycemic standard is included each time the test is run to validate it.

The precise dosage of the compound of Formula I, or a pharmaceutically acceptable acid addition salt thereof, to be employed depends upon several factors including the severity of the condition being treated, the mode of administration and the particular compound employed. However, in general, satisfactory results in the treatment of either obesity or diabetes are obtained when a compound of Formula I, or a pharmaceutically acceptable acid addition salt thereof, is administered at a daily p.o. dosage of 4–200 mg./kg. body weight or a dosage of about 300–2000 mg. for most larger mammals. In general, oral administration requires a higher dose than does intravenous administration. Usually, a small dosage is administered initially and the dosage is gradually increased until the optimal dosage for the host under treatment is determined. The daily dosage is usually divided into two to four equal portions.

The compounds of Formula I and their pharmaceutically acceptable salts may be formulated into conventional pharmaceutical compositions and administered by conventional modes of administration.

The compounds may be combined with pharmaceutically acceptable carriers and other conventional pharmaceutical adjuvants and administered orally in the form of tablets, dispersible powders, granules, capsules, elixirs, suspensions and the like or parenterally in the form of an injectable solution or suspension. The compositions may be prepared by conventional means and may contain one or more conventional adjuvants such as sweetening agents (oral compositions only), other flavoring agents (oral compositions only), coloring agents (oral compositions only) and preserving agents.

Tablets may contain the active ingredient in admixture with conventional excipients, i.e., inert diluents such as calcium carbonate, sodium carbonate, lactose, talc and sodium citrate, granulating and disintegrating agents, e.g., starch, gum tragacanth and alginic acid and also certain complex silicates, binding agents, e.g., starch, gelatin and acacia, and lubricating agents, e.g., magnesium stearate, stearic acid, talc and sodium lauryl sulfate. The tablets may be uncoated or coated by known techniques to delay disintegration and absorption in the gastrointestinal tract and thereby provide a sustained action over a longer period.

Capsules may contain a compound of Formula I, or a pharmaceutically acceptable acid addition salt thereof, alone or admixed with an inert diluent, e.g., calcium carbonate, calcium phosphate, kaolin, lactose and high molecular weight polyethylene glycols.

Suspensions, syrups and elixirs may contain a compound of Formula I, or a pharmaceutically acceptable acid addition salt thereof, in admixture with any of the conventional excipients utilized for the preparation of such compositions i.e., suspending agents, e.g., methylcellulose, tragacanth and sodium alginate, wetting agents, e.g., lecithin, polyoxyethylene stearate and polyoxyethylene sorbitan monooleate, preservatives, e.g., ethyl p-hydroxybenzoate, and diluents, e.g., ethanol, propylene glycol and glycerin.

Injectable compositions may contain salt and should, if necessary, be buffered to render them isotonic.

The preferred pharmaceutical compositions from the stand-point of ease of preparation and administration are solid compositions, particularly tablets and hard-filled capsules.

A typical dosage unit may contain 75 to 1,000 mg. of a compound of Formula I, or a pharmaceutically acceptable acid addition salt thereof.

A representative formulation prepared by conventional techniques for encapsulation in a hard gelatin capsule is:

| | |
|---|---|
| Compound of Formula I, | 200 mg. |
| Lactose (spray-dried) | 160 mg. |
| Colloidal silica (Cab-O-Sil) | 6 mg. |
| Alginic acid | 60 mg. |

A typical tablet may contain:

| | | |
|---|---|---|
| Compound of Formula I, e.g., the compound of Example 3 | 100 | mg. |
| Gum tragacanth | 10 | mg. |
| Lactose (spray-dried) | 197.5 | mg. |
| Corn starch | 25 | mg. |
| Talc | 15 | mg. |
| Magnesium stearate | 2.5 | mg. |

As is evident to those in the art, the compounds of Formula I may exist in three tautomeric forms, I(a), I(b) and I(c),

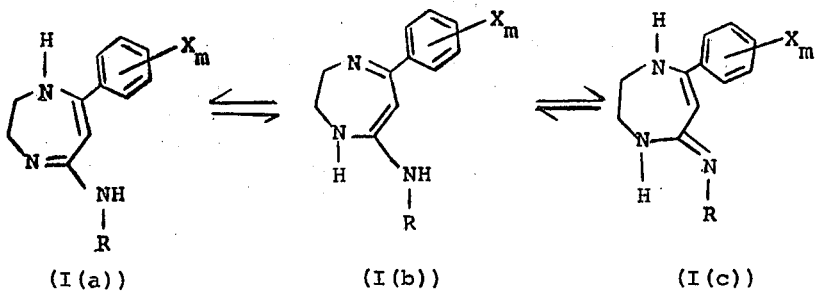

(I(a))    (I(b))    (I(c))

which interconvert in the presence of acid. For simplicity, Formula I(a) has been used exclusively throughout the specification. It should, therefore, be understood that Formula I is nothing more than a shorthand for Formulae I(a), I(b) and I(c) and that Formula I embraces the three tautomeric forms, I(a), I(b) and I(c). It goes without saying that all other formulae directed to the 1H-1,4-diazepines of this application (e.g., Formulae VI–XII) also embrace their respective tautomeric forms, i.e., the corresponding formulae wherein the hydrogen atoms (protons) and double bonds ($\pi$ bonds) are as in Formulae I(b) and I(c).

As is also evident to those in the art, the compounds of Formula III may exist in six tautomeric forms, III(a)–III(f),

EXAMPLE 1

α-[2-(2-Aminoethylamino)-2-(1,1-dimethylethylimino)ethylidene]-benzene methanol

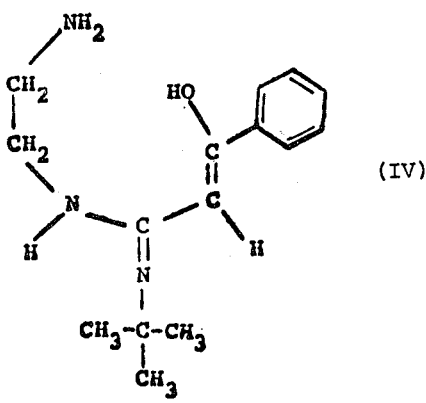

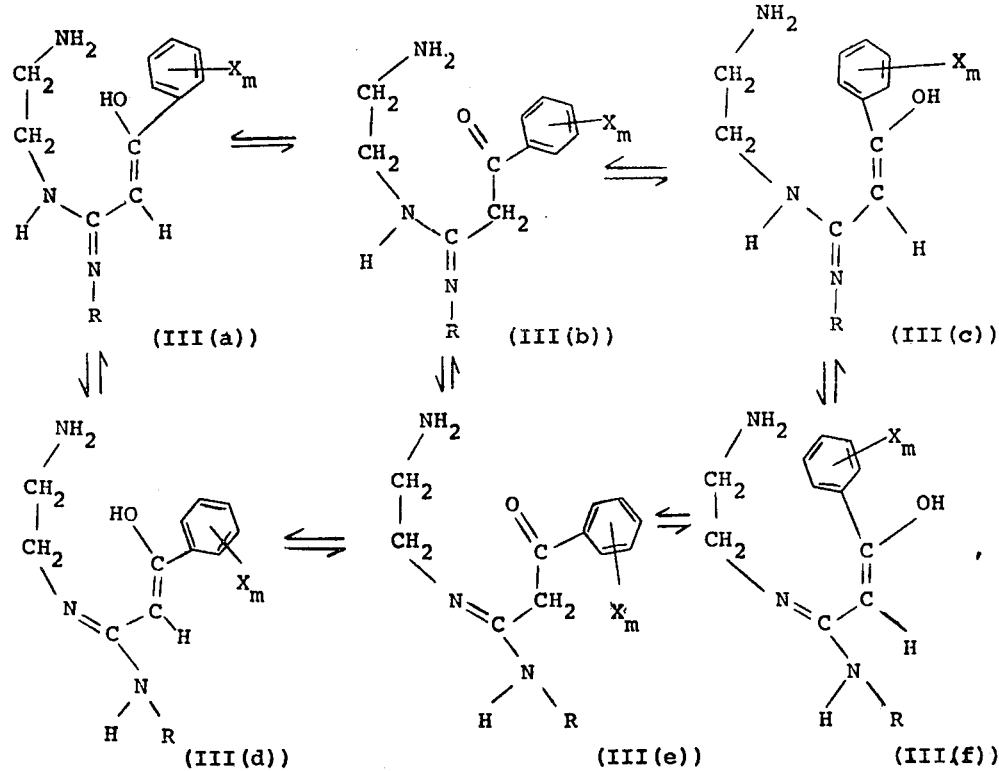

and numerous hydrogen bonded forms thereof, which interconvert. For simplicity, Formula III(a) has been used exclusively throughout the specification since it is believed to be the thermodynamically most stable form, and the hydrogen bonds have been omitted. However, it should be understood that Formula III is nothing more than a shorthand for Formulae III(a)–III(f) and that Formula III embraces all six tautomeric forms. It likewise goes without saying that Formulae IV and V also embrace their tautomeric forms, i.e., the formulae wherein the protons and $\pi$ bonds are as in Formulae III(b)–III(f) and the hydrogen bonded forms thereof.

The following examples show representative compounds encompassed by this invention and a process for their synthesis. However, it is to be understood that they are for purposes of illustration only.

50.0 ml. (750 mmol) of ethylene diamine were dissolved in 700 ml. of methylene chloride. 30.0 g (100 mmol) of 2-t-butyl-5-phenylisoxazolium perchlorate (J. Org. Chem. 31, 2039 (1966)) was added to the solution as a solid in small portions with stirring over a period of 20 minutes. The temperature of the reaction mixture was maintained at 20°–30°C. by cooling since the reaction is exothermic. Stirring was continued for one hour upon completion of the addition of the isoxazolium salt. The reaction mixture was diluted by addition of sufficient methylene chloride to bring the volume to 1 l. The reaction mixture was then extracted twice with 300 ml. portions of water and dried over anhydrous magnesium sulfate. The methylene chloride was stripped off at a reduced pressure to obtain an oil. The oil was dissolved in 300 ml. of anhydrous ether and filtered free of white solids. The white solids were washed with a small amount of anhydrous ether and the washings were combined with the filtrate. The combined filtrate and washings were evaporated at a reduced pressure to obtain the product as a colorless oil.

EXAMPLE 2

α-[2-(2-Aminoethylamino)-2-(1,1-dimethylethylimino)ethylidene]-benzene methanol.dihydrochloride

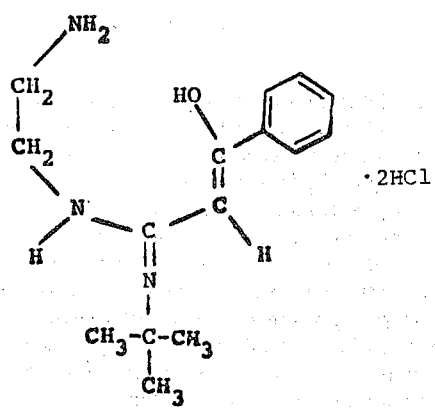

(V)

Addition of gaseous hydrogen chloride to a solution of the free base of Example 1 (Compound IV) yielded the product, m.p. 175°C. (decomp.)

N.M.R. (CD₃—SO—CD₃):
1.45 δ (9 proton singlet)
3.1 δ (2 proton multiplet)
3.6 δ (2 proton multiplet)
5.0 δ (2 proton singlet, both exchangeable)
7.6 δ (3 proton multiplet)
8.0 δ (2 proton multiplet)
8.6 δ (4 proton multiplet, all exchangeable)
9.7 δ (1 proton singlet, exchangeable)

EXAMPLE 3

5-t-Butylamino-7-phenyl-2,3-dihydro-1H-1,4-diazepine.perchlorate

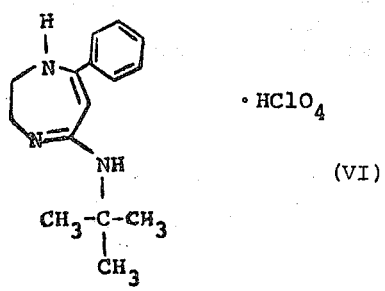

(VI)

24.0 g. (92.0 mmol) of the product of Example 1 (Compound IV) were dissolved in 200 ml. of absolute ethanol. The solution was acidified to a pH of about 1 with 70% perchloric acid, refluxed under nitrogen for one hour and allowed to cool to room temperature. Addition of 500 ml. of anhydrous ether gave the product in the form of white crystals. Recrystallization from ethanol/ether gave white crystals, m.p. 169°–171°C.

N.M.R. (CD₃—SO—CD₃):
1.3 δ (9 proton singlet)
3.5 δ (4 proton multiplet)
4.8 δ (1 proton singlet)
7.4–8.2 δ (8 proton multiplet, 3 exchangeable)

I.R. (nujol): 3400, 3340, 1630, 1585, 1550, 1325, 1210, 1080 cm⁻¹

U.V. (CH₃OH):
$\lambda_{max.}$ = 238 ($\epsilon$ = 14,900)

$\lambda_{max.}$ = 315 ($\epsilon$ = 22,100)
ED₅₀ (Test (a)): 34.3 mg./kg.

EXAMPLE 4

5-t-Butylamino-7-phenyl-2,3-dihydro-1H-1,4-diazepine.methanesulfonate

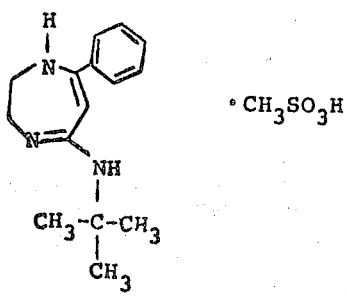

(VII)

2.50 g (9.5 mmol) of the product of Example 1 (Compound IV) were dissolved in 50 ml. of absolute ethanol, 1.00 g (10.0 mmol) of methanesulfonic acid was added, and the resulting reaction mixture was refluxed for 20 minutes. The reaction mixture was allowed to cool and the ethanol was removed at reduced pressure to obtain an oil. Trituration of the oil with anhydrous ether give the product as white crystals. Recrystallization from isopropanol/ether gave white crystals, m.p. 159°–162° C.

N.M.R. (CD₃-SO-CD₃):
1.4 δ (9 proton singlet)
2.3 δ (3 proton singlet)
3.6 δ (4 proton multiplet)
5.0 δ (1 proton singlet)
7.4–8.4 δ (8 proton multiplet, 3 exchangeable)

EXAMPLE 5

5-t-Butylamino-7-(2'-chlorophenyl)-2,3-dihydro-1H-1,4-diazepine.hydrochloride

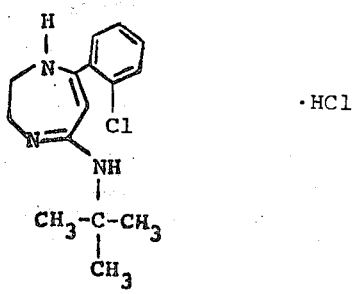

(VIII)

Following the procedures of Examples 1 and 3 or 4, the product is obtained from ethylene diamine and 2-t-butyl-5-(2'-chlorophenyl)isoxazolium perchlorate (using a solution of hydrogen chloride in ethanol for the cyclization) as a crystalline solid, m.p. 152°–155°C.

N.M.R. (CD₃—SO-CD₃):
1.35 δ (9 proton singlet)
3.6 δ (4 proton multiplet)
4.65 δ (1 proton singlet)
7.5 δ (4 proton multiplet)
8.05 δ (1 proton multiplet)
8.45 δ (2 proton multiplet)

I.R. (nujol): 3200, 1620, 1550, 1320, 1275, 1240 cm⁻¹

U.V. (CH₃OH):
$\lambda_{max.}$ = 232 ($\epsilon$ = 6,200)
$\lambda_{max.}$ = 306 ($\epsilon$ = 17,000)

EXAMPLE 6

5-t-Butylamino-7-(4'-methoxyphenyl)-2,3-dihydro-1H-1,4-diazepine.perchlorate

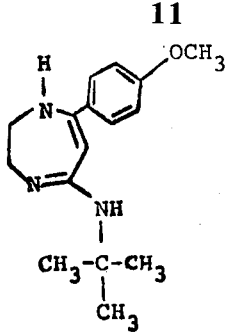

(IX)

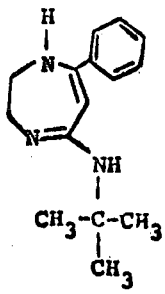

(XII)

Following the procedures of Examples 1 and 3 or 4, the product is obtained from ethylene diamine and 2-t-butyl-5-(4'-methoxyphenyl)isoxazolium perchlorate (using 70% perchloric acid for the cyclization) as a crystalline solid, m.p. 151°–152.5°C.

N.M.R. (CD$_3$—SO—CD$_3$):
1.3 δ (9 proton singlet)
3.5 δ (4 proton multiplet)
3.8 δ (3 proton singlet)
4.9 δ (1 proton singlet)
6.9 δ (7 proton multiplets,
8.3 δ 3 exchangeable)
I.R. (nujol): 3400, 3350, 1620, 1575, 1540, 1515, 1505, 1080 cm$^{-1}$
U.V. (CH$_3$OH):
$\lambda_{max.} = 214$ ($\epsilon = 8,750$)
$\lambda_{max.} = 258$ ($\epsilon = 9,650$)
$\lambda_{max.} = 318$ ($\epsilon = 23,200$)

EXAMPLE 7

5-Methylamino-7-phenyl-2,3-dihydro-1H-1,4-diazepine.perchlorate

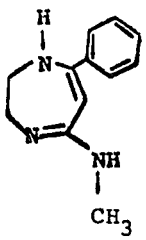

(X)

Following the procedure of Examples 1 and 3 or 4, the product is obtained from ethylene diamine and 2-methyl-5-phenylisoxazolium perchlorate (using 70% perchloric acid for the cyclization).

EXAMPLE 8

5-Ethylamino-7-phenyl-2,3-dihydro-1H-1,4-diazepine.methanesulfonate

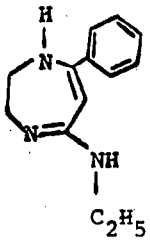

(XI)

Following the procedure of Examples 1 and 3 or 4, the product is obtained from ethylene diamine and 2-ethyl-5-phenylisoxazolium perchlorate (using methanesulfonic acid for the cyclization).

EXAMPLE 9

5-t-Butylamino-7-phenyl-2,3-dihydro-1H-1,4-diazepine 10.0 g. (29.5 mmol) of the methanesulfonate salt of Example 4 (Compound VII) were dissolved in 50 ml. of water, the solution was cooled in an ice bath and 50 ml. of 2N. sodium hydroxide were added. The aqueous solution was extracted twice with 150 ml. portions of chloroform, and the chloroform extracts were combined and dried over anhydrous magnesium sulfate. Removal of the chloroform at reduced pressure yielded an oil. Upon addition of 50 ml. of anhydrous ether, most of the oil dissolved leaving some off-white solids (1.0 g) which were removed by filtration. The filtrate was evaporated down to a minimum volume under reduced pressure. Slow addition of heptane and cooling yielded the product as white crystals (3.0 g.), m.p. 102°–103.5°C. A second crop (2.0 g.), m.p. 93°–97°C., was also obtained.

N.M.R. (CD$_3$—SO—CD$_3$):
1.3 δ (9 proton singlet)
3.6 δ (4 proton multiplet)
4.65 δ (1 proton singlet)
7.3 δ (7 proton multiplet, 2 exchangeable)
I.R. (nujol): 1620, 1580, 1315, 1260 and 1240 cm$^{-1}$
U.V. (CH$_3$OH):
$\lambda_{max.} = 234$ ($\epsilon = 13,200$)
$\lambda_{max.} = 318$ ($\epsilon = 19,300$)

All N.M.R. spectra were taken at ambient temperature on a 60 megacycle N.M.R. spectrometer and all chemical shifts are given in p.p.m. (δ) relative to tetramethylsilane. All U.V. data are given in mμ.

What is claimed is:

1. A compound of the formula

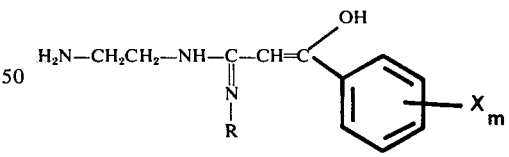

or an acid addition salt thereof,
wherein
R is alkyl of 1 to 6 carbon atoms,
each X is independently alkyl of 1 to 4 carbon atoms, alkoxy of 1 to 4 carbon atoms or halo, and
m is 0, 1 or 2.

2. A compound according to claim 1 having the formula

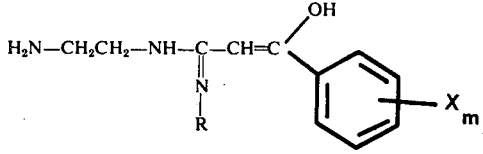

wherein
R is alkyl of 1 to 6 carbon atoms,
each X is independently alkyl of 1 to 4 carbon atoms, alkoxy of 1 to 4 carbon atoms or halo, and
m is 0, 1 or 2.

3. An acid addition salt according to claim 1 of a compound of the formula

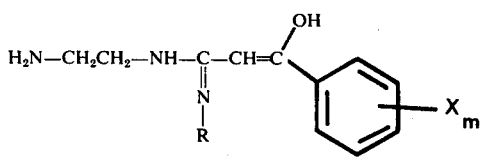

wherein
R is alkyl of 1 to 6 carbon atoms,
each X is independently alkyl of 1 to 4 carbon atoms, alkoxy of 1 to 4 carbon atoms or halo, and
m is 0, 1 or 2.

4. An acid addition salt according to claim 3 of a compound of the formula

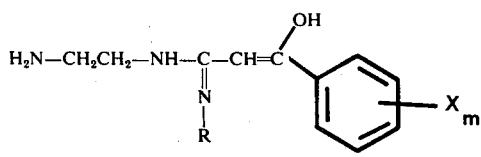

wherein
R is alkyl of 1 to 6 carbon atoms,
each X is independently alkyl of 1 to 4 carbon atoms, alkoxy of 1 to 4 carbon atoms or halo, and
m is 0, 1 or 2, said salt being a hydrochloride, hydrobromide, hydroiodide, phosphate, hydrogen phosphate, metaphosphate, sulfate, hydrogen sulfate, perchlorate, acetate, propionate, tartarate, citrate, gluconate, fumarate, malate, maleate, methanesulfonate, ethanesulfonate, benzenesulfonate or p-toluenesulfonate salt.

5. The compound according to claim 1 having the formula

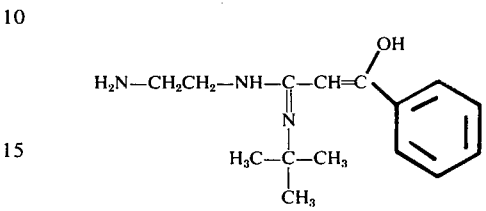

or an acid addition salt thereof.

6. The compound according to claim 5 having the formula

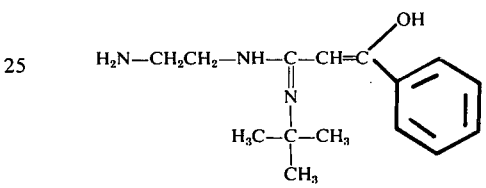

7. The acid addition salt according to claim 5 having the formula

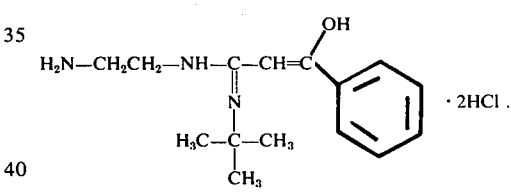

* * * * *